UNITED STATES PATENT OFFICE.

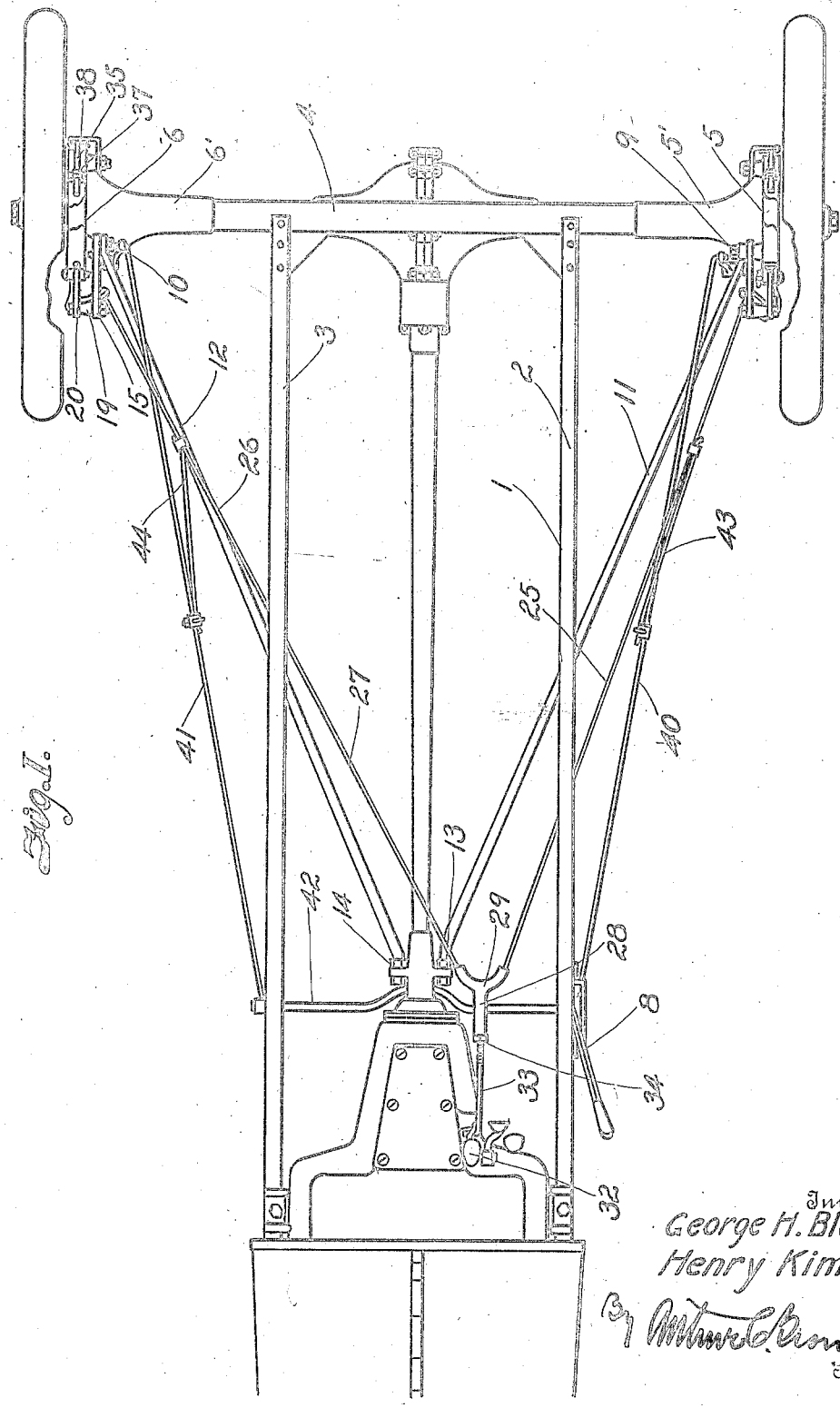

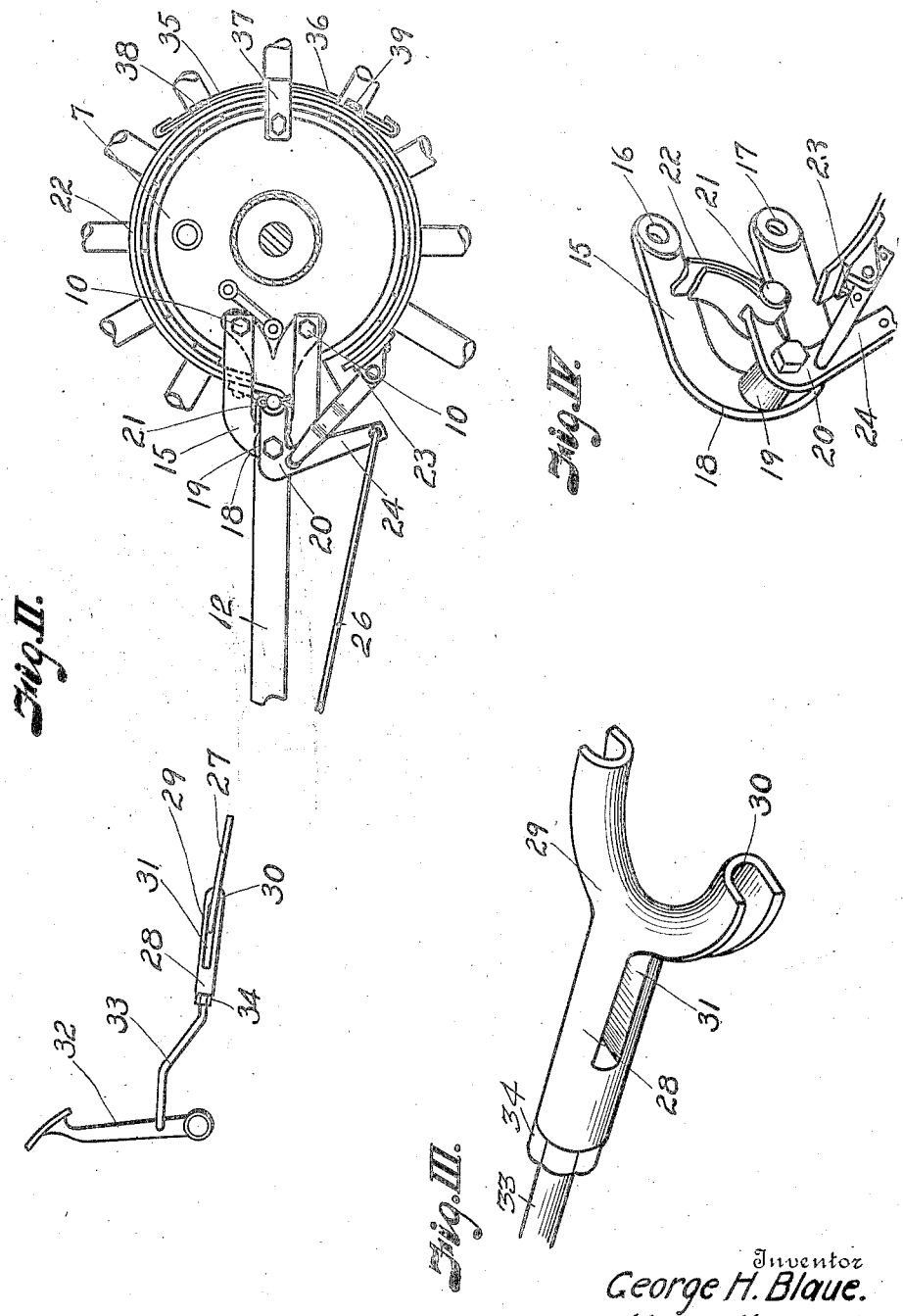

HENRY KIMMET AND GEORGE H. BLAUE, OF KANSAS CITY, MISSOURI; SAID KIMMET ASSIGNOR TO SAID BLAUE.

VEHICLE BRAKE.

1,411,664.  Specification of Letters Patent.  Patented Apr. 4, 1922.

Application filed May 10, 1920. Serial No. 380,134.

*To all whom it may concern:*

Be it known that we, HENRY KIMMET and GEORGE H. BLAUE, citizens of the United States, residing at Kansas City, in the county of Jackson and State of Missouri, have invented certain new and useful Improvements in Vehicle Brakes; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to motor vehicle brakes and one of the objects thereof is to provide an efficient, easily applied brake which may be conveniently attached to the motor vehicle without materially changing the construction thereof.

The invention is shown in the drawings as attached to a conventional form of motor vehicle, although it is not necessarily limited to this particular use.

In the drawings,

Fig. I is a plan view of a motor vehicle chassis to which our invention is applied.

Fig. II is a sectional view through the axle showing the brake drum in elevation and a brake constructed in accordance with our invention associated therewith.

Fig. III is a detail, perspective view of a cable head block attached to the foot lever of the motor vehicle and adapted to receive a cable from the brake lever at the rear of the vehicle, and Fig. IV is a detail, perspective view of a brake supporting bracket showing the brake lever and parts of the brake band.

Referring now to the drawings by numerals of reference:

1 designates the chassis of a motor vehicle including the side bars 2 and 3 and the rear axle 4. The rear axle carries brake drums 5 and 6 provided with the usual internal brake bands or shoes 7 operated in the usual manner from the hand lever or emergency brake lever 8.

Secured to the axle housings 5' and 6' by bolts 9 and 10 are radius rods 11 and 12, the radius rods being also secured to the transmission casing slightly in rear of the transmission by the bolts 13 and 14.

The construction just described is ordinarily found on existing types of motor vehicles.

Our invention is shown as consisting of means for applying an external band or shoe to the motor vehicle and we have illustrated the brake mechanism supporting brackets as consisting of U-shaped members 15 having at their ends, openings 16 and 17, which are adapted to be secured to the axle housings by the radius bolts 9 and 10, it being understood that there is a brake at each end of the rear axle. The elbow or bend in each U-shaped bracket is directed forwardly of the motor vehicle and at the bend or elbow portion 18 is an offset or spacer 19 to which is pivoted an elbow lever 20, one arm of which is secured to an end 21 of an external brake band 22, the other end of the brake band 22 being connected to the other arm of the lever 20 through the medium of a link 23. Therefore, when the depending arms 24 of the elbow levers 20 are moved in a forward direction, the bands will be constricted about the brake drums 5 and 6 to retard the rotative movement of the wheel.

The brake levers 20 are operated by the ends 25 and 26 of a cable 27, looped about an operating head or sheave consisting of a longitudinal member 28 having a forked end 29 provided with an arcuate cable-receiving groove 30, into which the cable 27 may be introduced by passing it through the elongated opening 31 in the member 28 (see Fig. III). The head is adjustably connected to the foot lever 32 through the medium of a link 33, which is adjustably connected to the member 28 and which is provided with a jam nut 34 to hold it in its adjusted position. The link connection with the head is simply a screw connection whereby adjustment may be made to take up slack in the cable 27. Therefore, if the parts are assembled and the operator exerts pressure against the pedal lever 32, tension will be applied to the ends 25 and 26 of the cable 27 so that forward movements will be imparted to the depending ends or arms 24 of the levers 20 so as to constrict the brake bands 22 about the brake drums 5 and 6 to retard the rotative movement of the rear axle.

The outer brake bands 22 are supported at the rear of the vehicle by the arms 35 and 36 on brackets 37, carried by the respective axle housings. The arms 35 and 36 slidably engage the loops 38 and 39 on the brake bands 22. The outer brake band can be applied without disturbing the arrangement of the usual inner band connected to the emergency brake lever through the cables 40 and 41, which engage the crank 42 operated from the emergency lever 8. The cables 40 and 41, however, are connected to the ends 25 and 26 of the cable 20 through the medium of link bars 43 and 44. Therefore, if the operator cannot apply the outer brake bands 22 with sufficient power to stop the car by placing his foot on the lever 32, the emergency brake may be brought into play, which will apply the internal brake bands and, through the medium of the links 43 and 44, also apply the outer brake band.

If a pull is exerted on the cables 40 and 41, both brakes will be applied by operating the emergency brake lever 8, it being obvious that there will be a slight slack in the cable ends 25 and 26 adjacent to the head. If, however, the brake is being applied by the foot pedal 32, there will be a slight slack in each cable 40 and 41 in front of the links 43 and 44. Therefore, the brakes may be applied either by the foot pedal or the emergency lever with convenience.

Since the U-shaped brackets 15 are fastened to the axle housings through the radius bolts 9 and 10 it being understood that the brackets 15 carry the entire braking mechanism adjacent to the wheel, and since the sheave or head consisting of the members 28 and 29, together with the cable 22, may be substituted for the ordinary brake operating mechanism connected to the foot pedal, it will be apparent that our improved brake may be applied without materially disturbing the organization of the motor vehicle. It will also be apparent that the brake may be applied without requisition of any special tools as the entire brake may be installed by the use of an ordinary wrench.

It will also be apparent that by providing the forked head 29 with the arcuate groove 30 and passing the cable 27 through the elongated slot 31, the head will act as a sheave, permitting the cable to exert equal pressure on both elbow levers 20 so that uniform braking power will be applied to both ends of the axle.

It is also apparent that, assuming the parts to be constructed and assembled as described, when the foot brake lever is depressed, the yoke 28 is drawn forward, pulling on the cable 27, which rocks the elbow lever 20, thereby drawing on both ends of the brake band to press the band against the brake drum and retard travel of the vehicle. Because of the free mounting of the cable in the yoke 28, pull on both elbow levers is equalized and a uniform braking effect produced that obviates strains on the vehicle and possible skidding of the rear wheels.

What we claim and desire to secure by Letters-Patent is:

1. In a vehicle braking mechanism, the combination with a vehicle frame having radius rods secured to the rear of the frame by pairs of bolts, of U-shaped brackets, the ends of which are fastened to the frame by the radius rod bolts, elbow levers pivoted to the U-shaped brackets, a brake band connected to the respective arms of each elbow lever, means for simultaneously operating the elbow levers to apply the brake bands, and brake drums to be engaged by the brake bands.

2. In a vehicle braking mechanism, the combination with a vehicle frame, of U-shaped brackets fastened to the frame, the bends of the brackets extending forwardly of the vehicle frame, elbow levers pivoted to the bends of the brackets, brake bands connected to the respective arms of the elbow levers, means for simultaneously operating said elbow levers to apply the brake bands, and brake drums to be engaged by the brake bands.

3. In a braking mechanism, a pair of brackets, an elbow lever pivoted to each bracket, a contractible brake band connected to each elbow lever, a head having a forked rear end with an arcuate groove therein, a cable looped over the grooved end and having its ends connected to the elbow levers, and means for attaching the head to a brake lever.

In testimony whereof they affix their signatures.

HENRY KIMMET.
GEORGE H. BLAUE.